Figure 3:
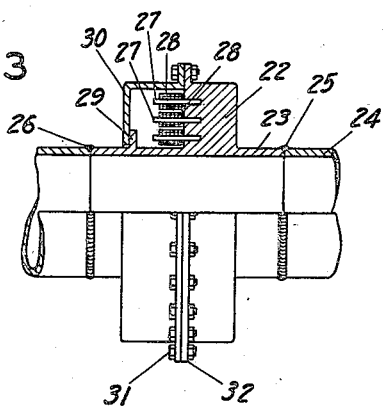

Sept. 10, 1946.  E. W. SMITH  2,407,299
COMMUNICATION IN PIPE LINES
Filed Jan. 10, 1934  2 Sheets-Sheet 1

INVENTOR
EDWARD W. SMITH
BY
Ezekiel Wolf
ATTORNEY

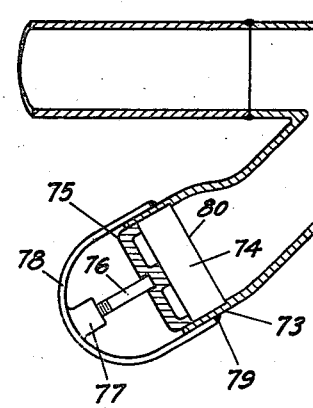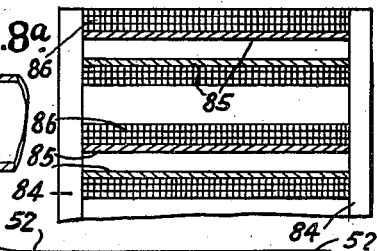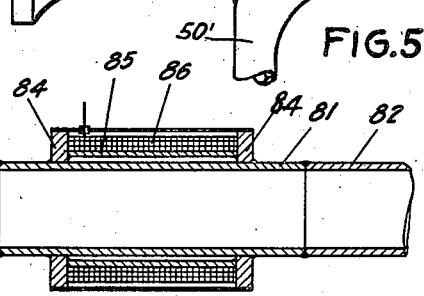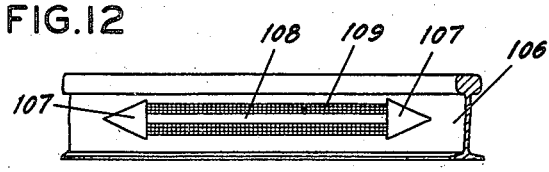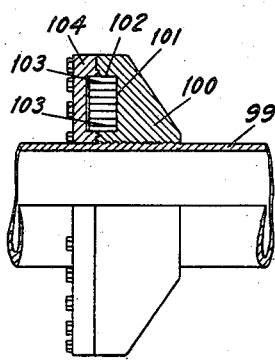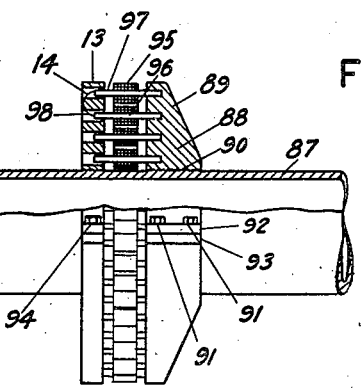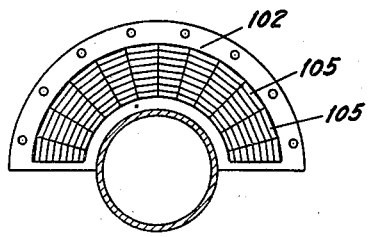

Patented Sept. 10, 1946

2,407,299

UNITED STATES PATENT OFFICE 2,407,299

COMMUNICATION IN PIPE LINES

Edward W. Smith, Melrose, Mass.

Application January 10, 1934, Serial No. 706,159

21 Claims. (Cl. 179—1)

The present invention relates to communication along pipe lines or other mechanical conductors by means of sound or compressional wave vibration.

At the present time pipe lines have been extensively used for the transportation of both oil and gas. These pipe lines extend frequently for a great distance, sometimes over 100 miles and usually are built in such a way that a continuous mechanical connection is made for the whole distance. Such lines are usually called all-welded lines when the joints between sections of the pipes are welded together.

Other connecting means, however, may be used, but in practically all cases a close metallic connection is made between sections of the line at all points.

In pipe lines for the use of oil and gas, it is customary to place pumping stations at distances between 25 and 50 miles in order to boost the pressure for the transmission of the oil or gas along the line. In order to operate these pumping stations satisfactorily, it is necessary to provide communicating means between the various stations and this has been heretofore accomplished by the use of telegraph, telephone or wireless communication.

Means of communication along the lines have been found to be quite essential, and while some delay in the means of communication may be tolerated, still it is essential to be able to transmit messages relative to the transmission of the oil or gas and the operation of the prior station on the line in order to operate the whole system satisfactorily.

The systems employed at the present time for communication using methods mentioned above are both expensive to install and to maintain with the possible exception of some forms of wireless communication against which there are, however, certain definite objections. Not only has wireless communication between stations proved to be expensive, but it is also apt to interfere with local broadcasting and communication and not always to be dependable under certain difficult transmission conditions.

In the present invention, communication is accomplished by means of the line itself which is made to act as a transmission line not for electromagnetic energy, but for the energy for compressional wave vibration. While the system is primarily to be used in connection with transmission of messages and signals along a pipe line, it may also be applied to other methods of communication along a continuous metallic conductor as, for instance, a railroad rail.

In the present invention a two-way communication may be established over the same line and it is also possible to signal in one direction only and to receive compressional wave vibrations from that direction. The communication may be by telegraph or code signals, or speech may be impressed over the line for telephonic communication. It will be appreciated, of course, that due to the fact that sound or compressional wave vibrations are transmitted at a much lower velocity than that of electromagnetic waves, that a two-way communication will not be simultaneous, but that considerable time may elapse between the transmission of speech or a message one way and the other way. For instance, if two stations are situated 25 miles apart upon the line, it will take approximately 8 seconds for the sound to travel the distance of 25 miles, which means that the sender at one end must wait approximately 16 seconds until he receives the message transmitted from the other end. This, however, is not objectionable under the special circumstances, as it undoubtedly would be in commercial telephonic communication. The operators at the various stations appreciate that such a delay is necessary and their operation of the transmitting stations at either end will be governed accordingly.

Figure 1:
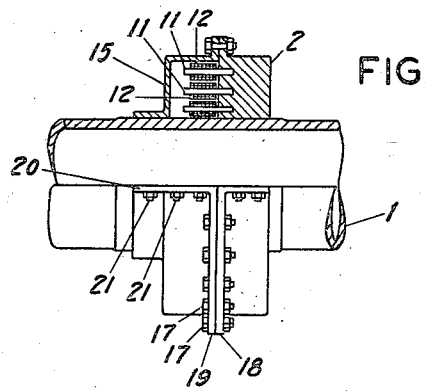
Figure 2:
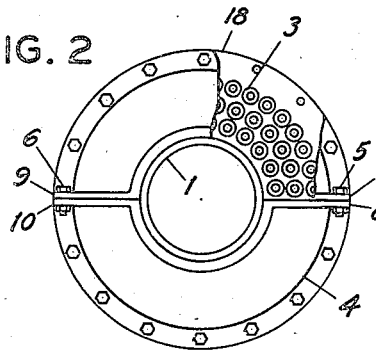
Figure 4:
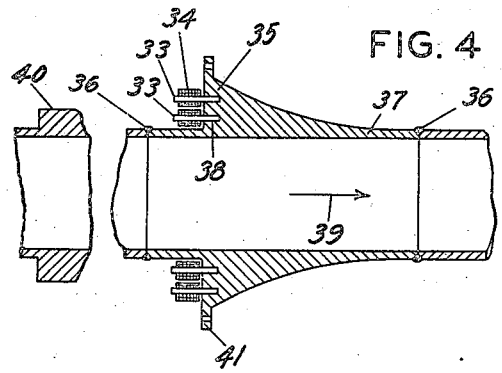
Figure 5:
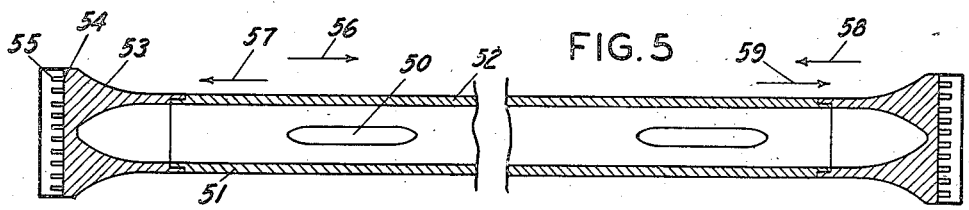
Figure 6:
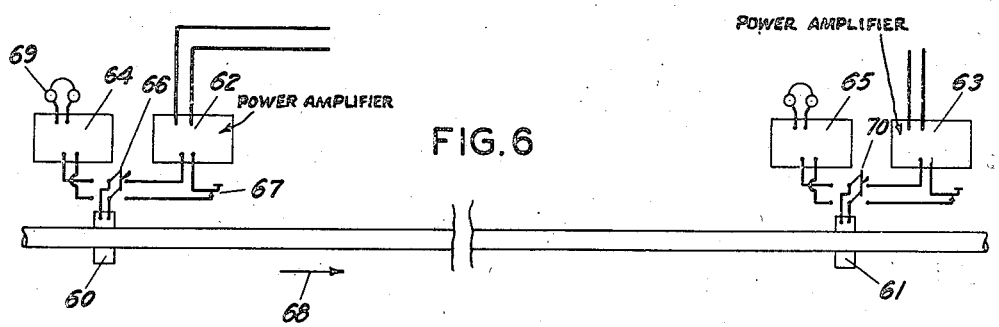

The present system will be more fully described in connection with the embodiments described below as illustrated by the drawings in which Figure 1 shows the invention in one of its forms as applied to a pipe line. Figure 2 shows an end view of the embodiments shown in Figure 1, with the cover removed. Figure 3 shows a modification of the device indicated in Figure 1 as applied to a pipe line. Figure 4 shows a further modification of the device of Figure 1, particularly adapted to transmit sound or compressional wave vibrations in one direction along the line. Figure 5 shows a further modification illustrating the application of the invention to two distant stations. Figure 5a illustrates how the invention is applied at the elbow of a pipe in accordance with Figure 5. Figure 6 is a diagrammatic illustration of the application of the invention to the transmission line showing complete sending and receiving stations and indicating the manner in which they are connected to the line. Figure 7 illustrates a still further modification of the application of the invention by means of an oscillator mounted to operate from an extension to the pipe line. Figure 8 shows a modification in which the compressional wave energy may be impressed directly upon the pipe line itself. Figure 8a illustrates a modification of the arrangement shown in Figure 8 where the magnetostrictive element does not surround the pipe. Figure 9 illustrates a further modification of the application of the invention. Figure 10 illustrates a modification which is particularly adaptable for the transmission of speech vibration by the use of a system in which a carrier wave may be modulated by speech frequency. Figure 11 shows a side view looking from the left of Figure 10 with the top cover removed. Figure 12 shows the invention as applied to a rail and Figure 13 shows an end view of the modification shown in Figure 12.

In the modification shown in Figures 1 and 2 the pipe is shown as 1. Pipes for the transmission of oil may be 8 inches in diameter and one-quarter inch thick and are frequently made of fusion welded pipes with joints butted and welded together throughout their entire length. In places there may be certain valves used and, if such is the case, an all metallic welded connection may be made around the valves to allow efficient sound transmission. As pipes for this purpose are usually of the dimensions described above, it has proved to be highly essential to employ compressional wave frequencies which will not require apparatus of excessive size to be used. This is particularly true since the wave length of compressional waves in steel is much higher than that in other media and for this reason the compressional wave frequencies used for this purpose are combined to the upper range of audibility and the supersonic range. It is possible, however, to bring the frequencies down to values of 10,000 cycles but frequencies much below this will demand apparatus of considerable size which will be difficult to mount and operate successfully in the positions required.

A heavy mass 2 formed in two parts 3 and 4 as indicated in Figure 2 is clamped to the pipe by means of the bolts 5 and 6, passing through the flanges 7 and 8, and 9 and 10, respectively, positioned on separate sides of the collar. The collar may be formed with a flat face at the back side coming down in a plane perpendicular to the axis of the pipe. On the front face of the mass are inserted by any suitable means, as for instance, by a forced fit, magnetostrictive rods 11, 11, etc. which are positioned close together in the surface of the collar and extend around the whole area as illustrated in Figure 2. Each rod may be separately excited by coils 12, 12, etc. and, as indicated in the modification shown in Figure 9, a return magnetic path may be provided by the plate 13, the coils being connected to one another in such a manner that the flux tends to circulate through the plate 13 between one coil and the next, as indicated by the arrow 14. The rods and coils at the face of the plate or a collar may be enclosed by means of a cover 15 which may be formed in two parts and be bolted by means of bolts 17, 17 to a flange 18 in the edge of the collar. The cover 15 for this purpose is provided with a flange 19 adapted to fit against the flange 18. The two halves of the cover may also be joined together along an element of the pipe by means of the flanges 20 in each half of the cover through which the bolts 21 may pass. In Figures 1 and 2 a device is shown which may be applied to an existing pipe without disturbing the operation of the system in any way. In this case the compressional wave device applied to the pipe is made in two or more parts and may be clamped or attached to the pipe.

In Figure 3 the compressional wave device is shown formed as a part of the pipe itself. In this figure the flange, or plate 22, is made integral with the pipe extension 23 which is the same size as the pipe 24 to which the invention is applied. The sound or compressional wave producing device in this case may be welded as a regular section or element in the pipe by a butted weld as indicated at 25 and 26. In Figure 3, as indicated, the mass or plate 22 is formed as one piece and the rods 27, 27 corresponding to the rods 11 of Figure 1 are similarly placed, as well as the coils 28, 28 corresponding to the coils 12. This construction is the same as in Figure 1. The section 23 may be provided with an outwardly extended flange 29 as indicated in the figure and a cover 30 may be applied, bolted by means of bolts 31 to the ring 32 formed as a part of the plate 22 providing an entirely enclosed space for the coils and rods. This is essential since the device is frequently positioned in the ground and may be subjected to usual outdoor weather conditions.

In the modification shown in Figure 4 the rods 33 and the coils 34 are applied as in the preceding figure to a mass 35 formed as a section in the pipe, the section being welded by the welded joints 36, 36 as indicated. In Figure 4 the mass 35 tapers from a larger dimension at one end to the pipe size at the other end. The taper may be of any desired shape but preferably is in the form of an exponential curve so that the compressional wave energy may be concentrated without excessive loss. In this figure at a point 37 on the mass the mechanical vibration is many times larger than at a point 38 so that transmission of sound or compressional wave energy will be in the direction of the arrow 39. In addition to this there may also be provided a section 40 in the pipe with a relatively large mass or which may, if desired, be constructed out of material such as lead which presents different properties for the transmission of sound and which would reflect most of the sound coming in its direction backward along the pipe line. The mass 35 may similarly, as shown in Figures 1 and 3, be provided with a flange 41 to which a cover may be clamped for enclosing completely the operating elements of the device.

In the system shown in Figures 5 and 5a, the pipe is formed in the shape of an elbow with branches 52 and 50′, the material such as gas or oil entering through an elongated opening 50 from a pipe which may be substantially perpendicular to the extension 51 at the end of which the compressional wave vibrations are impressed. The inlet in the elbow is purposely elongated so that the sound vibrations transmitted from the extension 51 along the pipe 52 are substantially unimpeded by the reduction of the cross sectional area of the pipe. At the end of extension 51 there is welded or joined in any suitable manner an end mass 53 which may be tapered at the right end 54 as indicated in Figure 5 to the dimensions and thickness of the pipe. The mass 53 closes the end of the pipe and forms a flat surface 54 perpendicular to the axis of the pipe. In this flat surface there may be placed outwardly extending rods 55 which may be energized in the manner shown and described in connection with Figures 1 and 3.

Figure 5 indicates a system in which a transmitting and receiving station is located at opposite ends of the line which may, of course, be distances from 25 to 50 miles apart. The devices at the ends of the lines may as indicated be the same or any of the other modifications described above may be used at one end or the other, as desired. The particular devices, however, shown in Figure 5 are directional to a large extent, the device at the left transmitting in the direction of the arrow 56 and receiving in the direction of the arrow 57 while the device at the right transmits in the direction of the arrow 58 and receives in the direction of the arrow 59.

In Figure 6 there is diagrammatically illustrated the lay-out of the entire system, 60 and 61 illustrating the sender and receiver or transceiver, as it may be called at different stations. The power amplifiers are indicated at 62 and 63 respectively and the receiver amplifiers at 64 and 65 respectively. When the system is used for sending at the left the switch 66 is thrown to the right and in this condition the key 67 is operated to transmit compressional wave impulses over the line in the direction of the arrow 68. When the switch 66 is thrown to the left, the station may be used for receiving and the operator listening with the phones 69 will pick up the translated sound vibrations transmitted over the line. The system connected with the transceiver 61 operates in a similar manner, the switch 70 being thrown to the right for sending and to the left for receiving.

In the modification shown in Figure 7, a section 71 is indicated as inserted within the line. This may be done by welding or by any other suitable manner. The section 71 is provided with an extending arm 72 at the end of which a special sleeve 73 is provided in which an oscillator 74 may be positioned. This oscillator may be of the type previously described or it may be of the electromagnetic or electrodynamic type operating at frequencies somewhat higher than usually employed with this type of apparatus. Frequencies from 5,000 to 10,000 cycles may, however, be suitable but I prefer to employ frequencies slightly above this range. The oscillator 74 is held in place by a clamping bridge 75. The clamping bridge is in turn pressed against the oscillator by means of the threaded rod 76 threaded into a boss or plate 77 formed as a part of a bridge element 78 which is welded to the outside of the sleeve 73 as indicated at 79. The diaphragm 80 of the oscillator may be vibrated to impress sound vibrations into the fluid as well as into the walls of the pipe and in the modification shown in Figure 7, when the pipe is filled with liquid, the sound will be transmitted to a great extent along the liquid rather than in the walls of the pipe.

In the modification shown in Figure 8, the section 81 inserted in the line 82 is provided with outwardly extending flanges 84 between which may be positioned a longitudinally magnetostrictive element, or elements, 85. Wound about the elements 85 and completely about the pipe is the coil 86 whereby the compressional wave vibrations are impressed upon the pipe line. In place of using a single coil wound about the entire pipe the coils 86 may be wound only about the rods 85, as indicated in Fig. 8a, and these may be inserted in place and clamped or held in any usual manner after the coil has been placed around them.

In Figure 8a there is shown a plurality of magnetostrictive rods 85 surrounded by coils 86, the rod 85 being attached to end plates 84 which may be clamped or attached in any suitable way as, for instance, by welding, as indicated in Figure 8, to the pipe line 82.

In the modification shown in Figure 9 the pipe 87 is provided with a collar 88 somewhat similar to that shown in Figure 1 except that the side 89 tapers outwardly to the pipe and the inner edge of the collar is ribbed at 90 to make a good contact for the pipe surface. The two halves of the collar are clamped together by means of the bolts 91 passing through the brackets 92 and into the bracket 93 of the lower half of the collar. The plate 13 is similarly held by means of the bolt 94. The coils 95 and 96 are wound as previously mentioned so that the flux in the rod 97 may flow outward to the plate 13 while the flux in the rod 98 flows away from the plate 13. In this manner the reluctance of the magnetic circuit has been considerably reduced.

In Figures 10 and 11 is shown the application of a piezo-electric element for the same purpose. Here the pipe 99 is provided with a split collar 100 held to the pipe in a manner similar to that described in connection with Figure 9. Each half of the collar is provided with an annular recessed portion 101 in which piezo-electric crystals, preferably of the Rochelle salts type 102, are placed endwise therein. Electrodes 103 are provided at opposite faces of the crystal and electrical energy is impressed between these faces to produce a longitudinal vibration of the crystal, which vibration is transmitted to the pipe. The recessed portion in which the crystals are placed may be covered by a cover 104 and the crystals may be entirely sealed in a liquid of oil or in any other suitable means whereby the vibrations of the crystals may be conveniently transmitted to the system. These crystals, being aperiodic in character, may be excited at a high frequency, for instance, 15,000 or 20,000 cycles per second, which frequency may be modulated by speech waves producing so-called carrier bands a number of thousand cycles on either side of the carrier wave. At the receiving end the carrier wave may be eliminated and the speech reproduced in the usual manner.

In Figure 11 there is shown a side view looking into the recessed portion 102 of one half of the collar. It will be noted that the crystals are preferably arranged in rows 105, 105 etc. and it may be also mentioned that these crystals may be connected in series or in a parallel series combination, whichever is desired to match the impedance of the circuit with which the device operates.

In Figures 12 and 13, there is shown a modification as applied to a rail 106. In this figure there is welded to the rail two cap elements 107, 107 which may have somewhat a conical shape as indicated in the figure. These cap elements may be at the end of a rod 108 of magnetostrictive material which in turn may be surrounded by a coil 109 in which electric variations corresponding to the sound wave vibrations may be impressed. The vibrations generated in the rod 108 are transmitted through the cap elements 107 to the rail 106 and thereby transmitted along the line. In this manner transmission may be effected along a railroad line for a considerable distance, particularly when the rails are bonded one to the other with a stiff metallic connection.

Having now described my invention, I claim:

1. A means for transmitting compressional wave vibrations along a metallic pipe line comprising a mass formed in a collar about the pipe, a plurality of magnetostrictive rods positioned in the collar and means for exciting the same.

2. A means for transmitting compressional wave vibrations along a metallic conductor comprising a mass formed as a collar about the conductor and means operatively connected to said collar for impressing compressional wave vibrations longitudinally along said conductor.

3. A means for transmitting compressional wave vibrations along a metallic conductor comprising a collar formed in at least two parts, means clamping the collar to the conductor and means operatively connected to the collar for producing compressional wave vibrations longitudinally along said conductor.

4. A means for transmitting compressional wave vibrations along a metallic pipe comprising a collar formed in at least two parts, means clamping the collar to the pipe, a plurality of magnetostrictive rods mounted in said collar substantially parallel with the pipe and means for exciting the same.

5. A means for transmitting compressional wave vibrations along a metallic pipe comprising a pipe section having formed as an integral part therewith an external mass, and magnetostrictive means mounted in said mass for vibrating the same.

6. A means for transmitting compressional wave vibrations along a metallic pipe comprising a pipe section having formed as an integral part therewith an externally projecting flange tapered at one end to the external pipe size and being provided with a flat surface substantially perpendicularly with the pipe, a plurality of magnetostrictive rods mounted in said flat surface, and means for exciting said rods.

7. A means for transmitting compressional wave vibrations along a metallic pipe comprising a pipe section having formed as an integral part therewith an external projecting flange having a flat surface substantially perpendicularly to the pipe, a plurality of magnetostrictive rods mounted in said flat surface, means for exciting said rods, and means for covering the surface to completely enclose the same.

8. A means for transmitting compressional wave vibrations along a metallic pipe in one direction comprising means adapted to send compressional wave in one direction, said means being mounted on the pipe, and means to reflect sound propagated in the other direction said means mounted in said pipe in the vicinity of the first means.

9. A means for transmitting compressional wave vibrations along a metallic pipe comprising an extension adapted to make contact with the pipe walls and extend outward at an angle therewith and means applied at said extension for vibrating the pipe.

10. A means for transmitting compressional wave vibrations along a metallic pipe comprising an extension formed with the pipe, means providing a surface perpendicular with the extension at the end thereof and closing the same and means mounted on said surface for producing compressional waves in said pipe.

11. A means for transmitting compressional wave vibrations along a metallic pipe comprising an extension formed with the pipe, means tapering said extension to a closed mass provided with a surface perpendicular to the extension and a plurality of magnetostrictive rods mounted in said surface for vibrating the same.

12. Means for transmitting vibrations along a pipe line including means providing a mass externally around the pipe, vibratory means attached to said mass means and extending longitudinally of the pipe including electrical means for energizing the same.

13. Means for transmitting vibrations along a pipe line including means attached to the pipe forming a large mass, means comprising a plurality of tubes mounted longitudinally with the pipe in said mass, said means being magnetostrictive and coil means surrounding said tubes for vibrating the same.

14. Means for transmitting vibrations along a pipe line comprising means forming a mass about said pipe, projecting normally from the direction of the pipe, electrical means for imparting vibrations to said mass including a tube mounted in said mass longitudinally with the pipe and coil means for vibrating said tube.

15. Means for transmitting vibrations along a pipe line comprising means forming a mass projecting normally from the direction of the pipe, magnetostrictive means mounted in said mass having an axis longitudinal with the pipe and means for applying energy to said magnetostrictive means.

16. Means for transmitting vibrations along a pipe line including a plate projecting normally as a flange from said pipe, means mounting said plate to said pipe, a plurality of magnetostrictive rods mounted in said plate and a plurality of coils, each surrounding one of the rods for energizing the same.

17. Means for transmitting vibrations along a pipe line comprising a collar surrounding said pipe, a plurality of magnetostrictive rods projecting on one side of said collar in a direction longitudinal with said pipe, a coil surrounding each of said rods and means forming a casing with said collar as one side and attached to the pipe at the other side.

18. A means for transmitting compressional wave vibrations along a metallic pipe comprising a pipe section having formed as an integral part therewith an external projecting flange having a surface extending outward from the pipe substantially normal thereto, a plurality of magnetostrictive rods mounted in said surface and means for exciting said rods.

19. In combination with a metallic conductor, an external mass rigidly secured thereto and electromechanical energy interchanging means associated with said mass.

20. In combination with a fluid conducting pipe, an external mass rigidly secured to the outside of said pipe and electromechanical energy interchanging means associated with said mass.

21. A communication system comprising stations located a distance apart, a metallic conductor connecting said stations, means at each station for receiving and transmitting compressional wave vibrations along said metallic conductor and means associated with at least one of said stations for enhancing the propagation of said compressional wave vibrations in a selected direction.

EDWARD W. SMITH.